(12) United States Patent
Hartmann

(10) Patent No.: US 7,290,343 B2
(45) Date of Patent: Nov. 6, 2007

(54) RECIPROCATING STROKE BAR BEARING

(75) Inventor: Markus Hartmann, Mauerstetten (DE)

(73) Assignee: Hilti Aktiengesellschaft, Schaan (LI)

( * ) Notice: Subject to any disclaimer, the term of this patent is extended or adjusted under 35 U.S.C. 154(b) by 138 days.

(21) Appl. No.: 10/740,325

(22) Filed: Dec. 17, 2003

(65) Prior Publication Data

US 2004/0187323 A1 Sep. 30, 2004

(30) Foreign Application Priority Data

Dec. 19, 2002 (DE) .............................. 102 59 565

(51) Int. Cl.
*B23D 49/00* (2006.01)
(52) U.S. Cl. .................. 30/394; 30/392; 83/699.21; 83/776
(58) Field of Classification Search .......... 30/392–394, 30/273; 83/699.21, 646, 647, 776, 779; 74/50, 74/60
See application file for complete search history.

(56) References Cited

U.S. PATENT DOCUMENTS

| | | | | |
|---|---|---|---|---|
| 2,722,244 A | * | 11/1955 | Schultz | 30/394 |
| 4,884,344 A | * | 12/1989 | Martinez et al. | 30/394 |
| 5,596,810 A | * | 1/1997 | Neubert et al. | 30/369 |
| 6,138,364 A | * | 10/2000 | Schmitz | 30/392 |
| 6,212,781 B1 | * | 4/2001 | Marinkovich et al. | 30/394 |

* cited by examiner

*Primary Examiner*—Boyer D. Ashley
*Assistant Examiner*—Carolyn T Blake
(74) *Attorney, Agent, or Firm*—Ableman, Frayne & Schwab

(57) ABSTRACT

A motor-driven saw has a gearing housing (4), which has at least two housing parts (6, 8), a stroke bar (10), which in operation executes a stroke movement in the direction of a stroke axis (26), and a reciprocating movement generator (36) that can be turned on or off, by virtue of which the stroke movement is superimposed with a reciprocating movement executed transverse to the stroke axis (26). All bearing zones (30, 44, 62) over which the reciprocating movement generator (36) is supported on the gearing housing (4) in a preferred direction of advance (16) of the saw, are arranged in the same carrying housing part (6).

8 Claims, 4 Drawing Sheets

RECIPROCATING STROKE BAR BEARING

BACKGROUND OF THE INVENTION

The invention relates to a motor-driven saw having a gearing housing, which has at least two housing parts, a reciprocating rod, which when operating executes a reciprocating movement in the direction of a stroke axis, and an openable and closable reciprocating movement actuator, by which the stroke movement can be superimposed with a pendular movement made transverse to the stroke axis.

Saws of this type are also known as "key-hole saws." The reciprocating stroke movement of the saw produces an improved advance feed power principally when working on wood. In contrast, when working metal, the reciprocating stroke movement has certain drawbacks. Devices are known, in which the reciprocating movement can be changed or can be turned off to obtain a purely linear stroke movement.

U.S. Pat. No. 6,212,781 discloses a saber saw with two housing halves with each accommodating a bearing bar of a stroke bar guide system. In this fashion, the stroke bar guide system can be pivoted about the axis of the two bearing bars relative to a stroke axis. At one of the ends of the guide pin facing away from the stroke bar guide system, the latter has an actuator pin oriented towards the rear end of the saw, the actuator pin projects into the guide slot of an adjustment/setting element. The housing halves each have a rectangular recess in a zone, in which both halves abut on the top part of the saw, whereby both recesses lie adjacent to each other and form a common receptacle for the setting element. By operating the setting element, the actuating pin is positioned vertical to the stroke axis over the guide slot, whereby the inclination of the stroke bar guide system and the force of the oscillating movement can be set.

This type of procedure requires relatively stable bearing zones in both housing parts for the studs, since relatively powerful forces act on the stroke bar guide system in operation. On the other hand, the sufficiently stable and deformation resistant connection of both housing parts must be assured. As a result, high material costs are incurred.

In addition, the assembly of the stroke bar guide system and the adjustment device between the two housing parts is relatively costly. Furthermore, in the bearing method of the adjusting device provided here, complete sealing of the gearing housing to the outside can be achieved only with considerable difficulty. Overall, high manufacturing costs are the result.

SUMMARY OF THE INVENTION

The object of the present invention is to eliminate the aforesaid drawbacks and to reduce the manufacturing costs, while providing also satisfactory sealing of the gearing. According to the invention, this object is achieved in that bearing zones, over which the reciprocating movement transmitter saw is supported on the gearing housing at preferred advance direction of the saw all are arranged together in or on a carrying housing part.

For these purposes, the working direction is called the "preferred" direction of advance. Conventional motor-driven saws, such as saber saws or fig saws, are normally intended for one advance/feed, which is directed away from the operator, even if an adjustment of the saw blade makes feed or advance possible in the opposite direction.

By virtue of the above method, all bearing forces occurring during operation of the reciprocating movement transmitter are transmitted to a single housing part. Consequently, these too must also be solidly designed. Other housing parts, which must fill a covering function, can be realized using economical materials and in relatively simple form. In addition, assembly of the reciprocating movement transmitter is considerably simplified because it must then be fastened to only one housing part. In this fashion, it is particularly possible to pre-mount all devices required for generating the reciprocating movement on the one housing part. Overall, this arrangement makes it possible to obtain a reduction in the costs of manufacture.

It is advantageous that the carrying housing part is produced as a solid cast or molded part. For example, the carrying housing part can be manufactured as an aluminum or magnesium pressure die cast or molded part. In this fashion, a housing with high strength is obtained. The forces occurring at the bearing zones of the housing can accordingly be safely absorbed.

Preferably, the gearing housing has at least one cover part, which is made of plastic to assure economical manufacture of the saw.

The bearing zones and the rest of the housing part, at least over a length of the carrying housing part over which the reciprocating movement generator extends, has a common release direction. In this manner, the carrying housing part, at least in the part in which the receiving zone of the reciprocating movement generator lies, can be manufactured using a relatively simple mold in a pressure casting process. Costly pushers or a second cutting working direction are eliminated, whereby the manufacturing costs are kept low. In addition, by virtue of the uniform release direction on the carrying housing part, the assembly of the saw is also simplified.

Advantageously, the reciprocating movement generator is connected to the carrying housing part using bearing bolts, whereby the bearing bolts have a tensile resistant connection with the carrying housing part. In the assembled state, the bearing bolts are consequently firmly tightened in the carrying housing part. In this manner, tensile/traction forces can also be transmitted to the carrying housing part via the bearing zones of the bearing bolts along with the bearing forces in the direction of pressure. Accordingly, even forces on the reciprocating movement generator, which occur in a working direction against the preferred direction of advance of the saw, are for the most part dissipated at the carrying housing part.

Advantageously, the reciprocating movement generator has a switching element, which is supported in the axial direction on the bearing bolts over the guide devices and can be displaced in a plan extending essentially vertically thereto. In addition, the reciprocating movement generator has a guide piece, which is mounted in the gearing housing to be pivotable about an axis transverse to the stroke bar. A contact zone is formed at the guide part, which can be applied to the switching element. By virtue of this method, the inclination of the guide part, over which the motor-side end of the stroke rod is guided, can be adjusted and can be safely supported on the gearing housing by the switching element and the bearing bolts.

It is also advantageous that at least one of the bearing bolts guides both the stroke bar and the switching element. A compact construction of the saw is thus made possible by virtue of this double guiding function of the bearing bolt.

In a preferred embodiment, the contact zone is formed by limiting the surfaces of a recess, through which the switching element protrudes. This arrangement makes it possible for the guide part to be supported on the switching element both in a working direction in the preferred direction of advance of the saw and in a working direction rotated thereto by approximately 180°. In both cases, it is possible for the guide part to be initially supported on the switching element only indirectly by a spring device and a direct contact of the guide part on the switching element occurs only with a certain work pressure on the saw blade. The switching element itself is supported by the carrying housing part by the bearing bolts both in the pressure and in the traction direction. Accordingly, the forces occurring on the guide part can be dissipated in a simple fashion and independently of the direction of advance of the saw at least predominantly on the carrying housing part.

Preferably, the switching element has a deflection element, which projects increasingly from the movement plane of the switching element in the direction of displacement and at which the docking zone can be placed. The interaction of the deflection element of the switching element with the contact zone of the guide part makes a seamless change in the inclination of the guide part possible by shifting the switching element perpendicular to the axial direction of the bearing bolts. When this is done, there are multiple possibilities for precise adjustment of the inclination of the guide part and consequently the determination of the magnitude of the reciprocating stroke.

It is advantageous if a spring device is arranged, between the switching element and a free side of the guide part, which urges the two elements apart. In this manner, the contact zone of the guide part locks contact with the deflection element of the switching element in each position. Consequently, the position of the contact zone is relatively stable vis-à-vis the deflection element. Undesired adjustments of the reciprocating stroke are avoided in operation as a result of vibrations.

Advantageously, the switching element has a guide path, in which an operating element of a switching device engages. A simple and precise possibility for adjusting the position of the switching element is provided by virtue of the layout of the guide path.

It is of advantage, that the operating element is configured as an eccentric on a rotary switch, which is mounted in a round recess in the housing. This type of rotary switch makes possible on the one hand a precise and continuous adjustment of the operating element in the guide path of the switching element and thus also the inclination of the guide part or the magnitude of the reciprocating movement. On the other hand, the round seating of the rotary switch in the gearing housing makes a good sealing of the gearing space of the saw to the outside by using a seal ring possible.

In a preferred embodiment, the rotary switch is arranged in the second housing part. This is possible, only because those forces act on the rotary switch that are required to move the switching element vertically relative to the bearing bolts. Accordingly, it is possible to provide the rotary switch in the less stable second housing part, if necessary. When this is done, the rotary switch can be arranged in a particularly visible position on the upper part of the saw. In addition, the mounting of the rotary switch has the same release direction as the other two housing parts. In this manner, at the time of manufacturing the two housing parts simple mold tools can be used without additional pushers.

The mounting of the rotary switch can be economically manufactured. On the other hand, the final assembly of the saw is simplified by pre-assembly of the rotary switch in the cover part.

BRIEF DESCRIPITION OF THE DRAWINGS

The invention will be more completely described below with reference to the drawings, wherein:

FIG. 3 shows a longitudinal section of the gearing part with reciprocating stroke on.

DETAILED DESCRIPTION OF THE INVENTION

Figure 1:
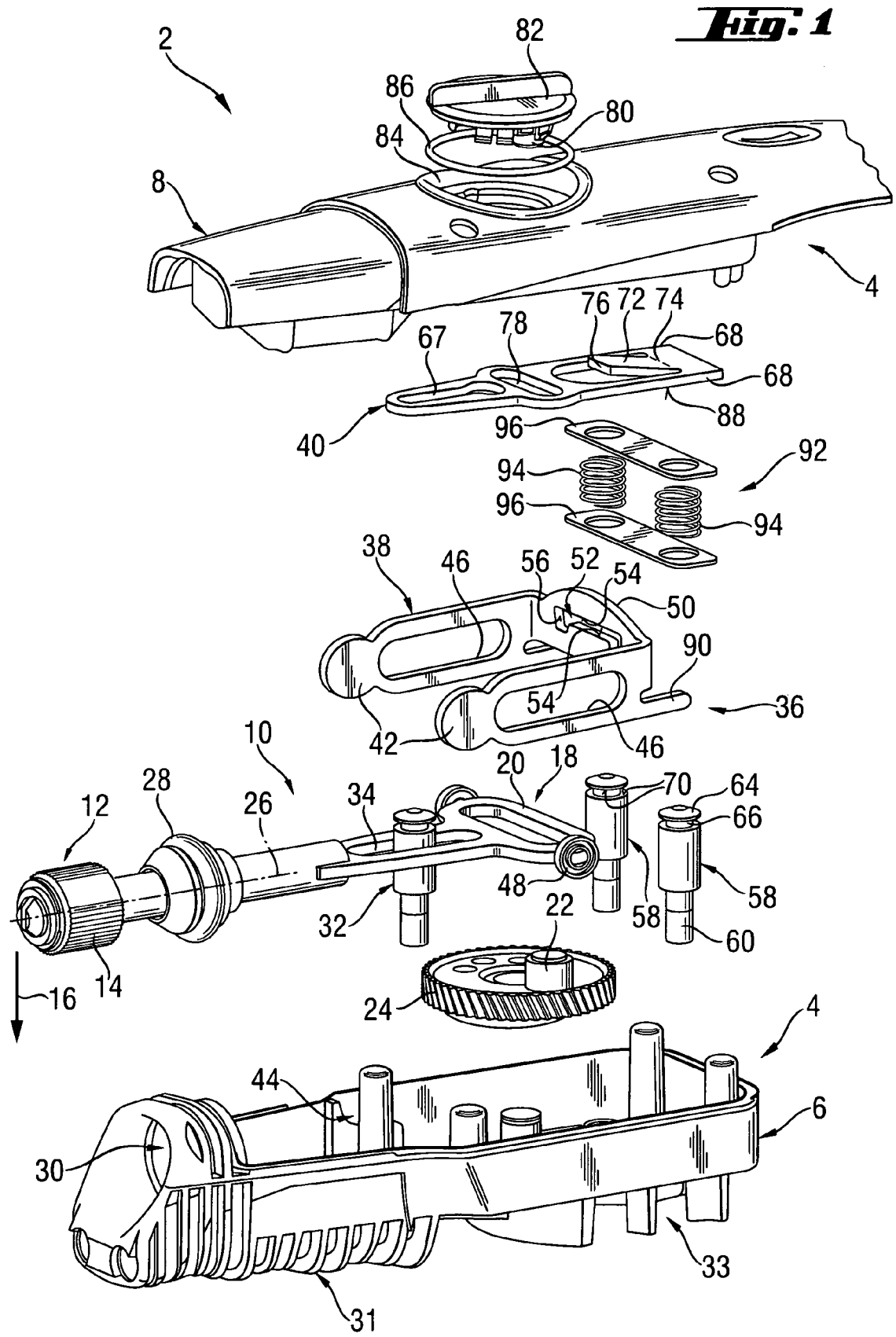
FIG. 1 shows an exploded view of the gearing part of a saber saw according to the invention.
Figure 2:
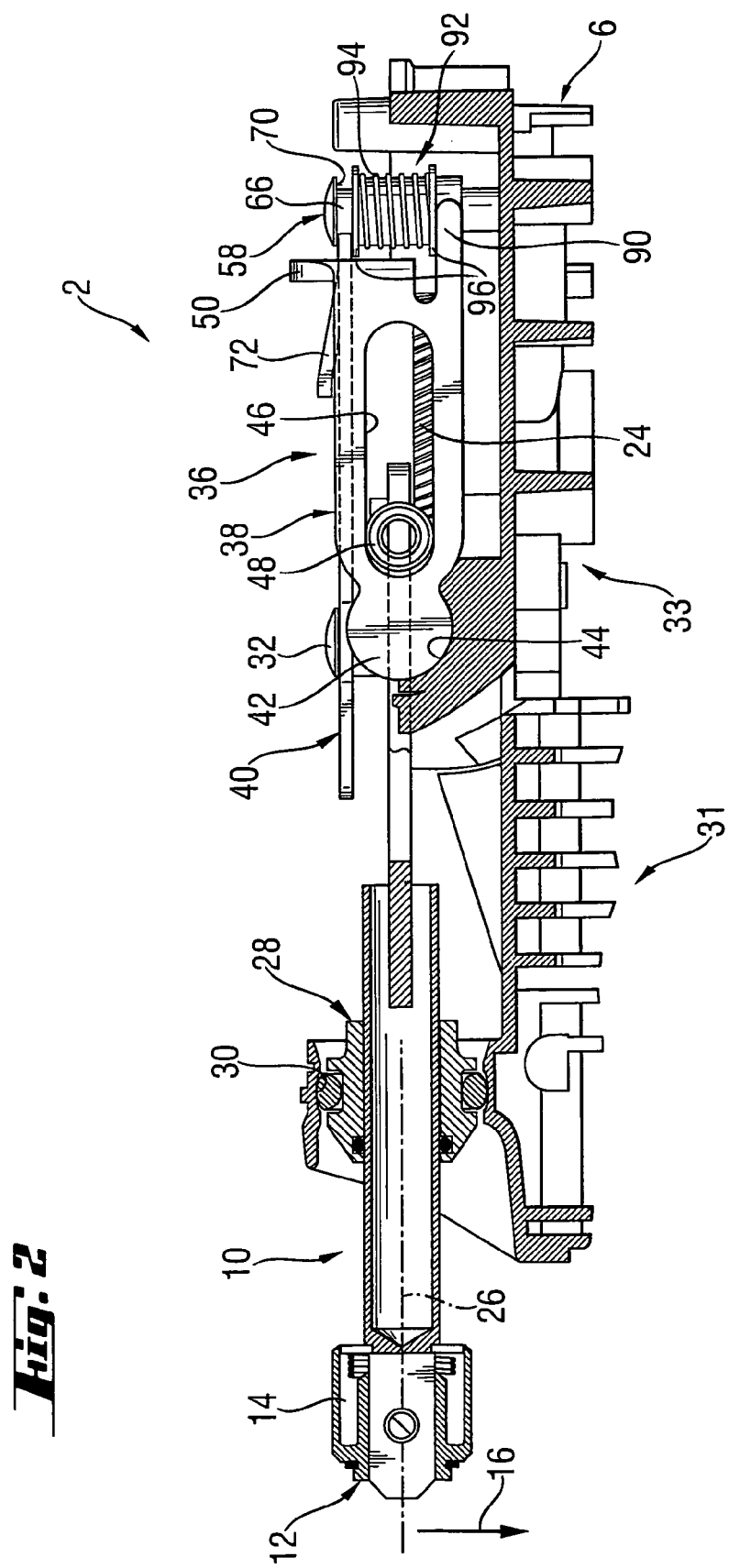
FIG. 2 shows a partial section of a carrying housing part with stroke bar and reciprocating movement generator.

In the following, the terms "front", "back", "top" and "bottom" refer to an orientation of the saw, as shown in FIGS. 1 to 4, and to the orientation assumed by the saw, with it is held as intended by an operator. The designations "horizontal" and "vertical" refer to a stroke axis 26 assumed to be horizontal.

FIGS. 1 to 4 show gearing part 2 of a motor-driven saw such as a saber saw. The gearing part 2 has a gearing housing 4, which includes a carrying housing part 6 and a cover part 8 that are connected together at the time of assembly of the saw. The carrying housing part 6 is manufactured in an aluminum or magnesium pressure casting process. The cover part 8 is made of plastic.

The gearing part 2 has a stroke bar 10, at whose tool-side end 12 a tool receptacle 14 is provided. The tool receptacle 14 is used for fastening a tool (not shown) such as a saw blade, with which a work piece (not shown) can be worked. The arrow 16 indicates the preferred direction of advance of the saw, in the direction of which the work piece is principally worked. In this instance, the saw is designed so that an operator urges it away from him/herself. Nonetheless, the tool receptacle 14 also makes installation of the saw blade rotated opposite to the preferred direction of advance; for example, opposite to the preferred direction of advance 16 possible. The operator pulls the saw towards him/herself.

At a motor-side end 18, the stroke bar 10 has a drive part 20, at which a drive eccentric 22 of a drive gear 24 operates. The drive gear 24 is driven by a motor (not shown), which is arranged outside of the gearing housing 4. The stroke bar 10 is moved by the drive gear 24 along a stroke axis 26. The guiding of the stroke bar 10 is performed radially to the stroke axis 26 by virtue of a bearing element 28, which is held in a peripheral bearing zone 30. In addition, in the horizontal direction, transverse to the stroke axis, there is a guiding by virtue of a bearing bolt 32, which engages through a longitudinal opening 34 in the stroke bar 10 in the direction of the stroke axis 26.

The carrying housing part 4 is divided along its length in the direction of the stroke axis 26 into a grip piece 31, at which the peripheral bearing zone 30 is formed, and in a receiving zone 33, in which a reciprocating movement generator 36 is housed. The reciprocating movement generator 36 has an essentially U-shaped guide part 38 and a switching element 40. The guide part 38 has two rounded bearing ends 42, which are rotationally mounted in complementary pivot bearing zones 44 in the housing, transverse to the stroke axis 26. The pivot bearing zones 44 are formed, in the assembled stated, by adjacent recesses of the carrying housing part 6 and the cover part 8. The guide part 38 has two guide paths 46, in which a roller 48 is guided, which are mounded on the drive part 20 of the stroke bar 10.

A slot 52 is provided at a free end 50 of the guide part 38. The switching element 40, in the assembled state, protrudes through this slot 52, whereby the guide part 38 is supported on the switching element 40 in docking zones 54, which are formed by limiting surfaces 56 of the slot 52.

The switching element 40 is displaceably mounted over the front bearing bolts 32 and two back bearing bolts 58, parallel to the stroke axis 26. The bearing bolts 32, 58 each have a bearing end 60 for this purpose, each of which is fixed in a cylinder-shaped bearing zone 62 in the receiving zone of the carrying housing part 6. The bearing zones 62 are formed by recesses in the receiving zone 33 of the carrying housing part 6. These cylindrical bearing zones 62 have a common release direction, with the parts of the pivot bearing 44 formed in the receiving zone 33 of the carrying housing part 6 and with the remaining part of the receiving zone 33, that is, they have openings that remain the same size or increase in size in the parallel direction.

In contrast, the bearing bolts 32, 58 have guide devices 66 in the form of constrictions at one free end 64. The switching element 40 is guided horizontally in the zone of a guide slot 67 by the guide devices 66 of the front bearing bolt 32. In contrast, a narrow peripheral side 68 of the switching element 40 protrudes into each of the guide devices 66 of the back bearing bolt 58. In the vertical direction; that is, in the direction of the bearing bolt 32, 58 the switching element 40 is held on both sides by radially spanned constriction surfaces 70.

It is also conceivable, that the bearing bolts 32, 58 are used for guiding a counter mass (not shown). This type of guide could be achieved by additional constriction on the bearing bolts 32, 58.

In the zone in which the docking zone 54 of the guide piece 38 is supported, the switching element 40 has an approximately rectangular deflection element 72; for example, in the form of an adjustment tab or an adjustment member with a flat cross-section. The deflection element 72 is connected at a first narrow side 74 with the rest of the switching element 40 and at a free, second narrow side 76 increasingly protrudes from the rest of the flatly configured switching element 40. In this fashion, the deflection element acts as a ramp above and below relative to the rest of the switching element.

In addition, a guide track 78 is provided on the switching element 40. An operating element 80 engages in this guide track 78, which is formed eccentrically on an inward facing side of a round rotary switch 82 of the gearing housing 4. The rotary switch 82 is rotationally mounted in a complementary housing recess 84 of the cover part 8. A seal ring 86 is provided between the rotary switch 82 and the housing recess 84.

At its end facing away from the tool receptacle 14, the reciprocating movement generator 36 has a spring device 92 between a bottom side 88 of the switching element and two projecting arms 90 on the free side 50 of the guide part 38. This device has two helical springs 94, which are arranged between two drilled plates 96, wherein both the helical springs 94 and the drilled plates 96 are pushed onto the rear mounting bolts 58. In this manner, the two helical springs 94 urge the bottom part 88 of the switching element 40 and the arms 90 of the guide part away from each other via the drilled plate 96.

In the assembly described, to overlay stroke movement of the stroke bar 10 along the stroke axis 26 with a reciprocating movement, the guide part 38 is inclined vis-à-vis the stroke axis 26. This is achieved by turning the rotary switch 82 and the associated pivoting of the operating element 80 connected thereto. When this is done, the switching element 40, with which the operating element 80 is engaged via the guide track 78, is shifted horizontally rearwards away from the tool receptacle 14, whereby the deflecting element 72 is moved into the slot 52 and accordingly urged against an upper one of the docking zones 54. The free side 50 of the guide part 38 is pivoted upwards, whereby an inclination of the guide part 38 vis-à-vis the stroke axis 26 results.

Figure 3:
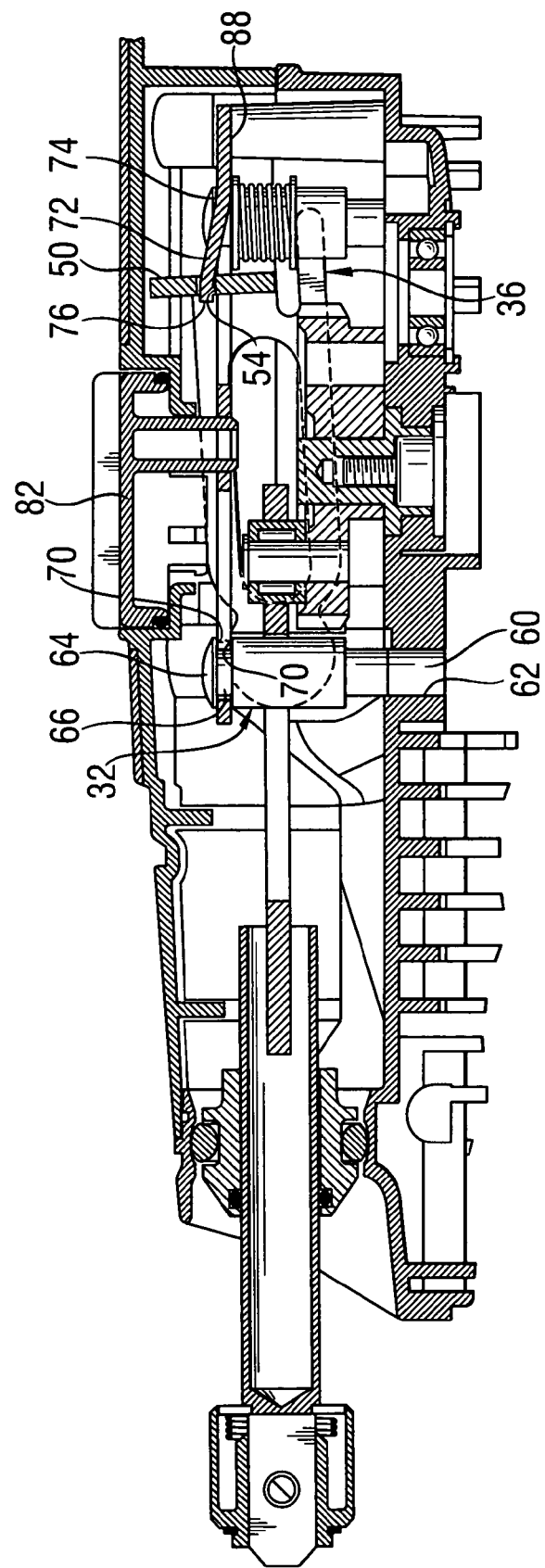

By virtue of the inclination of the guide part 38, as shown in FIG. 3, the motor-side end 18 of the stroke bar 10 is deflected up by the rollers 48 guided in the guide track 46 of the guide part 38. The desired reciprocating stroke movement results therefrom. Depending on the degree of rotation of the rotary switch 82, the inclination of the guide part 38 and the magnitude of the reciprocating movement can be continuously adjusted.

Figure 4:
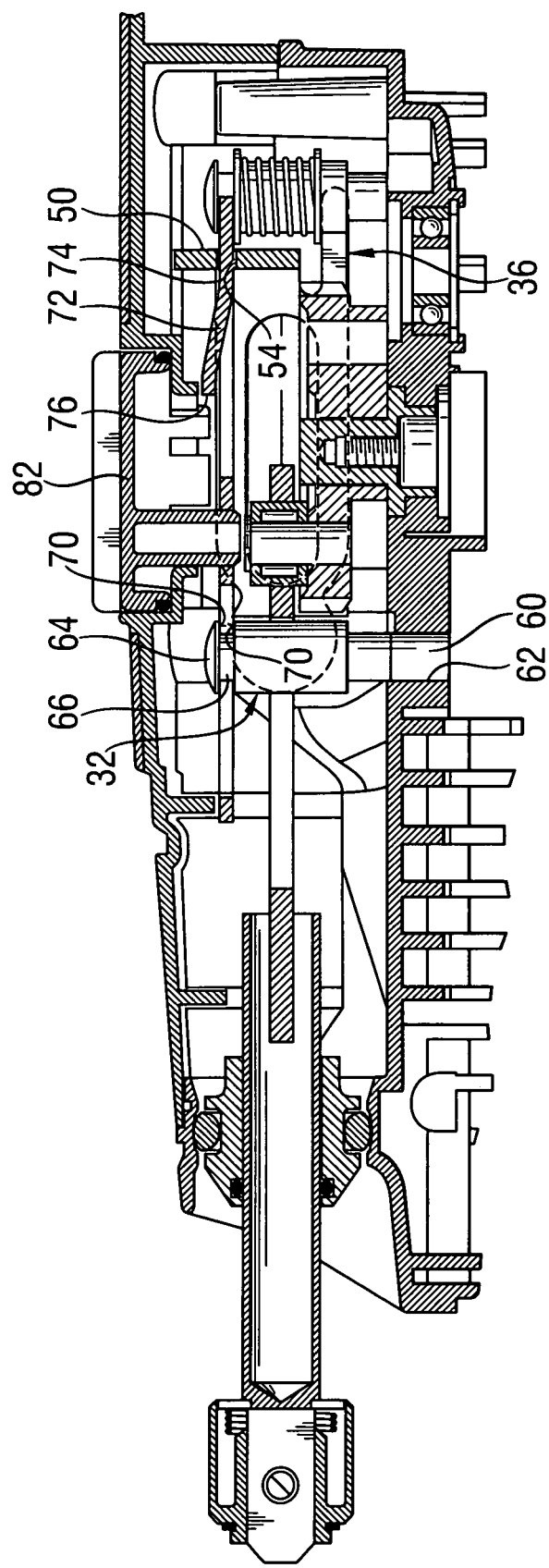
FIG. 4 shows a longitudinal section of the gearing part with the reciprocating stroke off.

In addition, as shown in FIG. 4, it is also possible to bring the guide part 38 into a horizontal position parallel to the stroke axis 26 by rotating the rotary switch 82, whereby the reciprocating movement is eliminated. In this fashion, a purely linear stroke movement of the stroke bar 10 is achieved along the stroke axis 26.

When working a work piece in the preferred direction of advance 16 of the saw, bearing forces occur primarily via the tool receptacle 14, the stroke bar 10 and the bearing element 28 at the upper part of the peripheral bearing zone 30 and further via the stroke bar 10, the drive part 20, the rollers 48, the guide track 46, the guide part 38, the upper of the clocking zones 54, the deflection element 72, the switching element 40, the contraction surfaces 70, the bearing bolts 32, 58, the bearing ends 60 at the bearing zones 62 of the carrying housing part 6. In addition, other bearing forces occur over the rounded bearing ends 42 and the pivot bearings 44 on the carrying housing part 6.

When working a work piece against the preferred direction of advance 16, the path of the force is essentially the same, with the exception that the guide part 38 initially contacts the switching element 40 only indirectly; that is via the spring device 92. Only when the work piece effects a specific pressure upon the tool do the bottom parts of the contact zones 54 of the guide part 38 come into direct contact with the switching element 40. The further bearing forces then occur via the rounded bearing ends 42 and the pivot bearing 44 on the cover part 8.

What is claimed is:

1. A motor driven saw comprising a gearing housing (4) with at least two housing parts (6,8), a stroke bar (10) that executes a stroke movement in a direction of a stroke axis (26) and a reciprocating movement generator (36) that can be turned on and off and by which the stroke movement is superimposed with a reciprocating movement executed transverse to the stroke axis (26), wherein the reciprocating movement generator (36) is supported on the gearing housing (4) in a preferred direction of advance (16) of the saw by bearing zones (30, 44, 62), wherein all bearing zones (30, 44, 62) are arranged on a same carrying housing part (6), and wherein the reciprocating movement generator (36) has a switching element (40) that is supported on bearing bolts (32, 58) by guide devices (66) in an axial direction of the bearing bolts (32, 58) and is displaceable in a plane vertical thereto, a guide piece (38) that is mounted in the gearing housing (4) rotatable about an axis transverse to the stroke bar (10) and placed in contact at the switching element (40) via a contact zone (54).

2. The motor-driven saw of claim 1, wherein the stroke bar (10) and the switching element (40) are guided via at least one of the bearing bolts (32, 58).

3. The motor-driven saw of claim 1, wherein the contact zone (54) is formed by limiting surfaces (56) of a slot (52), and the switching element (40) projects through the slot (52).

4. The motor-driven saw of claim 1, wherein the switching element (40) has a deflection element (72) that protrudes increasingly from the plane of movement of the switching element (40) in the direction of displacement and brought to contact with the contact zone (54).

5. The motor-driven saw of claim 1, wherein a spring device (92) is arranged between the switching element (40) and a free end (50) of the guide part (38), wherein pressure loads both elements.

6. The motor-driven saw of claim 1, wherein the switching element (40) has a guide track (78) and wherein an operating element (80) of the switching element engages in the guide track (78).

7. The motor-driven saw of claim 6, wherein the operating element (80) is eccentric on a rotary switch (82) that is mounted in a round recess in the housing (84).

8. The motor-driven saw of claim 7, wherein the rotary switch (82) is arranged in a cover part (8).

* * * * *